(12) United States Patent
Bird (10) Patent No.: US 11,236,721 B2
(45) Date of Patent: Feb. 1, 2022

(54) VERTICAL AXIS WIND TURBINES

(71) Applicant: Gregory Francis Bird, Milwaukee, WI (US)

(72) Inventor: Gregory Francis Bird, Milwaukee, WI (US)

(*) Notice: Subject to any disclaimer, the term of this patent is extended or adjusted under 35 U.S.C. 154(b) by 0 days.

(21) Appl. No.: 16/718,308

(22) Filed: Dec. 18, 2019

(65) Prior Publication Data

US 2020/0200143 A1 Jun. 25, 2020

Related U.S. Application Data

(60) Provisional application No. 62/782,104, filed on Dec. 19, 2018.

(51) Int. Cl.
| | | |
|---|---|---|
| *F03D 1/04* | (2006.01) | |
| *F03D 1/06* | (2006.01) | |
| *F03D 9/25* | (2016.01) | |
| *B60B 39/12* | (2006.01) | |

(52) U.S. Cl.
CPC ............ *F03D 1/04* (2013.01); *B60B 39/12* (2013.01); *F03D 1/0625* (2013.01); *F03D 9/25* (2016.05); *F05B 2220/706* (2013.01); *F05B 2240/133* (2013.01); *F05B 2240/912* (2013.01); *F05B 2260/20* (2013.01); *F05B 2260/421* (2013.01); *F05B 2260/96* (2013.01)

(58) Field of Classification Search
CPC . F03D 1/04; F03D 1/0625; F03D 9/25; F03D 9/39; F05B 2240/133; F05B 2260/20; F05B 2220/706; F05B 2260/96; F05B 2260/421; F05B 2240/912; Y02E 10/72; Y02E 10/728

See application file for complete search history.

(56) References Cited

U.S. PATENT DOCUMENTS

| | | | |
|---|---|---|---|
| 5,391,926 A | 2/1995 | Staley et al. | |
| 5,520,505 A | 5/1996 | Weisbrich | |
| 7,235,893 B2 | 6/2007 | Platt | |
| 8,961,103 B1 | 2/2015 | Wolff | |
| 2007/0296219 A1* | 12/2007 | Nica | F03D 3/062 290/55 |
| 2008/0131281 A1 | 6/2008 | Kariya | |

(Continued)

FOREIGN PATENT DOCUMENTS

KR 10-2010-0123958 11/2010

OTHER PUBLICATIONS https://startuptv.io/en/video/uprise-energy/ Uprise Energy has Developed the World's First Mobile Wind Turbine viewed Mar. 29, 2020.

(Continued)

*Primary Examiner* — Tulsidas C Patel
*Assistant Examiner* — Joseph Ortega
(74) *Attorney, Agent, or Firm* — Andrus Intellectual Property Law, LLP (57) ABSTRACT

A vertical axis wind energy power turbine having a hollow shaft on which are attached, rotating and fixed components with outer-surface shapes, fixed vanes, and integral heating to concentrate without confining airflow, an overspin-limiting power-enhancing self-engaging flywheel, and, conversion systems for both, pumped air that may be transferred through hollow mountings to do other work, and, for electricity generation.

22 Claims, 8 Drawing Sheets

(56) References Cited

U.S. PATENT DOCUMENTS

| 2015/0107224 A1 | 4/2015 | Aten |
| 2016/0084227 A1 | 3/2016 | Krippene |
| 2016/0186725 A1* | 6/2016 | Dofredo ................. F03D 9/007 60/641.12 |
| 2016/0377053 A1 | 12/2016 | Reyna et al. |

OTHER PUBLICATIONS https://www.4coffshore.com/news/seatwirl-and-crest-forge-brazil-alliance-nid17073.html SeaTwirl and Crest forge Brazil alliance viewed Mar. 31, 2020.
https://www.popularmechanics.com/science/a31264880/rooftop-wind-power-aeromine-airfoils/ viewed Aug. 17, 2020.
https://www.cnx-software.com/2020/07/14/compact-wind-turbine-generates-up-to-800-watts-outputs-12v-or-24v-dc/ viewed Aug. 17, 2020.
https://www-cnx-software-com.cdn.ampproject.org/v/s/www.cnx-software.com/2020/07/14/compact-wind-turbine-generates-up-to-800-watts-outputs-12v-or-24v-dc/amp/?amp_js_v=a2&_gsa=1&usqp=mq331AQFKAGwASA%3D#referrer=https%3A%2F%2Fwww.google.com&_tf=Fr... viewed Aug. 17, 2020.
https://www.halcium.com viewed Nov. 9, 2020.
https://www.euronews.com/living/2020/09/30/could-this-be-the-safest-most-powerful-wind-turbine-in-the-world viewed Nov. 9, 2020.
International Search Report and Written Opinion issued in corresponding PCT/US2019/67434, dated Mar. 19, 2020.
https://phys.org/news/2020-11-supersized-turbines-energyand-physics.html viewed Apr. 20, 2021.
https://www.bloomberg.com/news/articles/2020-11-23/wind-turbine-from-vestas-collapses-at-site-in-northern-sweden viewed Apr. 20, 2021.
https://www.greentechmedia.com/articles/read/south-korean-firm-touts-novel-vertical-axis-wind-turbine-tower-concept viewed Apr. 20, 2021.
https://www.bbc.com/future/article/20200903-the-wind-turbines-standing-up-to-the-worlds-worst-storms viewed Apr. 20, 2021.
https://www.zephyrpower.com/product-services viewed Apr. 27, 2021.
http://www.icewindusa.com viewed Apr. 27, 2021.
Ragheb M., "Vertical Axis Wind Turbines," Nov. 13, 2008. Last accessed Oct. 22, 2021 and publicly available from https://pdfcoffee.com/vertical-axis-wind-turbines-pdf-free.html.
D'Ambrosio, M. et al., "Vertical Axis Wind Turbines: History, Technology and Applications, Master Thesis in Energy Engineering—May 2010," Last accessed Oct. 22, 2021 and publicly available from https://www.diva-portal.org/smash/get/diva2:326493/FULLTEXT01.pdf
Nobile, R. et al., "Unsteady flow simulation of a vertical axis augmented wind turbine: A two-dimensional study," J.Wind Eng. Ind. Aerodyn. 125 (2014) 168-179, https://www.sciencedirect.com/science/article/pii/S0167610513002808, publicly available.
Image of external rotor generator from www.pengky.cn, retrieved Apr. 27, 2021.

\* cited by examiner

VERTICAL AXIS WIND TURBINES

CROSS-REFERENCE TO RELATED APPLICATION

The present disclosure is based on and claims priority to U.S. Provisional Patent Application No. 62/782,104 filed Dec. 19, 2018, the disclosure of which is incorporated herein by reference.

FIELD

The present disclosure relates to wind turbines, and specifically to vertical axis wind turbines.

BACKGROUND

Energy in atmospheric wind has been harnessed to do useful work across human history. Skins or woven materials broke the force of wind on people, leading to clothes, tents, and eventually sails attached to rotating devices. Siting locations at which to build wind-to-work devices early may be seen in pre-industrial crafted devices which survived into industrialization, especially in steady winds of the Fertile Crescent, China, and North Europe coast. As more robust industrial techniques and materials were applied to converting wind energy to usable power, certain sites more isolated from populations with stronger winds were identified as more valuable than traditional flat landscapes, as in landforms where ground- and near-ground winds are forced to compress and gain speed, prominent examples being San Gorgonio, Tehachapi, and Altamont Passes.

Additional constraints to the effectiveness and expansion of free-fuel wind energy conversion devices include noise, visual blade flicker disruptions from moving large utility-scale and smaller horizontal axis airfoil blade devices, poor built-environment acceptance and effectiveness, flying creature collisions, limits to wind energy conversion because of wind-speeds below aircraft flight forces causing overspin shut-down of other bladed devices, failure to produce during calm winds, icing, risks of blade failure preventing siting in existing utility corridors, limited application of flight system and other technologies, etc.

SUMMARY

This Summary is provided to introduce a selection of concepts that are further described below in the Brief Disclosure and Detailed Disclosure. This Summary is not intended to identify key or essential features of the claimed subject matter, nor is it intended to be used as an aid in limiting the scope of the claimed subject matter.

In certain examples, a wind turbine includes a shaft vertically extending along an axis and a plurality of stator blade sets coupled to the shaft and extend radially outward therefrom. A rotor is rotatably coupled to the shaft and has extending radially inward rotor blade sets that encircle the shaft and are interdigitated with the plurality of stator blade sets to thereby pump air when rotor rotates and limit rotor over-spin. An upper cowl is coupled to the shaft vertically above the rotor and a lower cowl coupled to the shaft vertically below the rotor such that the rotor, upper cowl and the lower cowl radially inwardly concentrate, without confining, an airflow across the rotor's narrowest diameter with more frequent drive blade contacts such that the rotor rotates and the wind turbine generates electrical and/or pumping power.

Various other features, objects, and advantages will be made apparent from the following description taken together with the drawings.

BRIEF DESCRIPTION OF THE DRAWINGS

The present disclosure is described with reference to the following Figures. The same numbers are used throughout the Figures to reference like features and like components.

BRIEF DISCLOSURE AND DETAILED DISCLOSURE

Brief Disclosure

This disclosure's device, without limitation, describes abstraction, idealization, and improvements of the more valuable landform sites in section, which concentrates at a notch focus moving airflow (e.g., winds) and/or other fluids, translated into the rotor part of a turbine. In half-section, the turbine includes a compound concentrating curve with a notch focus, rotated 360 degrees to create a finial-like shape to maximize force on rotating turbine parts.

Exemplary embodiments of the wind turbine as disclosed herein include a central vertical hollow shaft with component mounts. Connectors are passable through the shaft into the center passage via the shaft sidewalls. The shaft may be affixed at the bottom to a hollow mast or other supporting device without limitation. The hollow mast exemplarily, in addition to conducting connectors, allows passage of pumped air generated by the incorporated stator/rotor axial pump of the turbine exterior to the shaft through hollow passageways between supporting structures to other more easily accessible rotating or energy producing devices. The exterior of the shaft exemplarily allows passage, between device component structural connections and the exterior of the shaft, of gravity-falling atmosphere-carried debris coming through the separation gap between an upper cowl, upper exterior rotor components, and a lower flywheel. A 360-degree multi-section lower cowl is affixed without limitation to the outer support ring of the lower shaft exterior and thereby further defines debris clearing and pumped air passageways.

Exemplary embodiments of the shaft may include, affixed to the exterior of the shaft at keyed locations appropriate spacers, shoulders, races, bearings, pick-up coils, and permanent or electro-magnet arrangements. Exemplary embodiments of the shaft may further include rotatably affixed auxiliary flywheel driven by a rotor adjacent to it when the rotor rotates at a predetermined speed. Electricity is generated by electro-magnets in the rotating rotor, which couple with permanent magnets that are adjacently affixed to the auxiliary flywheel. The permanent magnets may also excite current in coils affixed to the shaft or a section of the lower cowl via connectors to the shaft central passage.

Affixed to the exterior of the shaft at keyed locations are appropriate spacers, shoulders, races, bearings, pick-up coils, permanent- and electro-magnet arrangements, and other attachments, capable of suspending a rotor with an incorporated internal axial pump with typical rotating parts corresponding to fixed parts on the shaft. A burner stage of the axial pump is capable in calm weather of burning hydrogen and oxygen generated via electrolysis and stored on-site, or other fuels fed to a burner unit through the orifices defined in the shaft sidewall and exhausting to voids between device support connections, other rotor internal components, and/or rotor external drive surfaces with section profile of concentrating curve, central shaft void without limitation.

An upper cowl is affixed to the top of the shaft. This is done with a keyed shoulder with threaded or snap-fitted corresponding to the surface around the top orifice of the hollow shaft, without limitation. An exterior section line of the fixed upper cowl traces the upper part of a finial-like concentrator shape, with an air intake at a lower outside edge of the cowl in an under-hang of the aerodynamic section/profile line of finial-like concentrator at the 360-degree cowl transitions to a finial top surface. The upper cowl includes concentric top and bottom mounted internal baffles that define an air path from the circumferential air intake utilizing winds from any direction within the upper cowl to remove solids via gravity and moisture in turbulent flow zones. Heating of moisture and intake air may occur via solar contact at the finial top surface and/or from rotor heat. Drain systems/weep holes allowing moisture and small particulates to drain and control internal pressures as treated airflow enters the internal axial pump. The upper cowl includes pick-up coils that interact with rotating permanent magnets at a top of the rotor. The upper cowl can include passageways for connectors from cowl components to enter the center of the hollow shaft.

An exemplary embodiment of the shaft includes an insulating component which forms a lockable cap incorporating lightning strike protections and a central passage through which an insulated lightning ground connection is connected to the earth. A threaded/snap-fit component with an insulated attachment for the lightning conductor exemplarily attaches to a corresponding threaded/snap-fit component at a top of the central passage of the hollow shaft.

The auxiliary flywheel increases the spinning mass when the rotor spins fast enough to generate enough electricity to excite electromagnets at the lower surface of the rotor in correspondence with permanent magnets affixed to the flywheel in close proximity to effectively lock the rotor and the flywheel when the rotor speed is above a predetermined speed. Accordingly, the flywheel serves as a power take-off to limit over-spin of the rotor and to add to the power curve by pairing or locking the rotor to the flywheel to increase volume of air pumped and electricity generated.

The lower auxiliary flywheel wall closest to the hollow shaft exterior includes upper and lower bearings that precisely suspend the flywheel. A surface next farthest from the shaft is an inside surface of a pumped air passage. This surface also supports structural connectors that extend to the outer flywheel cooperating with the axial pump. The upper surface of the outer flywheel proximal to the lower surface of the rotor is angled to allow gravity to remove particles via a debris passage near a rotor/flywheel evenly-spaced separation line. The outer flywheel upper surface corresponds to the inner lower surface of the lower cowl upper part so as to minimize debris entry from, and facilitate debris exit to, an outer flywheel/cowl upper separation line.

The outer edge of the lower surface of the auxiliary flywheel has widely spaced foil/pelton drive regions similar to those at the rotor notch and rotor upper exterior that are driven through vents and concentrating surfaces along structural supports connecting upper and lower portions of the lower cowl to overcome inertia of the resting flywheel independent of the rotor spin speed until the rotor spin excites rotor electromagnets of the rotor/flywheel locking system. The lower surface of the outer flywheel below the foil/pelton drive region angles up toward the shaft and corresponds in proximity to the inner surface of the lower portion of the lower cowl so as to limit, by gravity, particulates entering the close separation flywheel/cowl lower separation gap. Below the top of the lower separation gap, the separation gap slopes down to the bottom of the shaft debris passage and away from the device. The flywheel and adjacent non-rotating components may have combinations of permanent magnets and coils and/or slip rings arranged to generate electricity.

Embodiments of the lower cowl are composed of multiple sections and combinations of sections, without limitation, which are fit around the flywheel loosely until the sections are adjacent to and interlock with each other. The sections are then securely connected to corresponding positions relative the lower shaft outer support ring or other means without limitation. The inner surfaces of the lower cowl may correspond to the flywheel as described above. The outer surface of the lower cowl sections transition to complete the section/profile line of the finial look from the inner concentrating curves of the finial shape to the bottom connection.

In certain exemplary embodiments, at the outer edge of the cowl, rib-like structures connect the cowl upper and lower portions. The rib-like structures are shaped to duct air to and thereby excite the flywheel foil/pelton drive region. In certain exemplary embodiments, the cowl, without limitation, are constructed by connecting two separate pieces representing upper and lower cowl portions at the structural ribs, or, by having a unitary lower cowl portion with interlocking upper cowl sections securely connected at the structural ribs.

At the outer surface of upper portion of the lower cowl above the flywheel is an attachment for a vane to be affixed to the lower cowl sections. The vane protrudes in a scoop profile on its inner surface to further concentrate airflow at the rotor notch of the rotor and includes an airflow concentrating winglet along the inner-most part of the chord of the vane being parallel to an imaginary center radian such that concentrated winds are greater on the drive side of the rotor than the return side, and density and pressure are differentiated on the two sides of the device when in a 360-degree array. The vanes are coupled to the lower cowl and extend inward along the lower exterior surface of the rotor.

The rotor is suspended by main bearings at shoulders on the outer surface of the shaft. The rotor is composed of a body framework with an inner axial air pump having bladed structural supports at the top and the bottom that connect to outer bearing races at the shaft and to outer rotor components, such that the stages of the rotor blade sets and the stator blade sets work to move/pump air. As noted above, a burner stage may be included which pumps fuels that produce exhaust exiting through orifices and separation gaps in the components and mostly pumped through pumped air path connectors in supports to drive additional machinery. The exterior section line of the outside surfaces of the rotor form part of the finial concentrator curve. The lower surface of the rotor is angled to correspond to the adjacent surface of the flywheel to facilitate debris particles falling through the separation gap and not fouling the rotating parts.

Electromagnets are located near the angled lower surface of the rotor, and electromagnets may be excited from current generated from coils adjacent to a circumferential inner rotor chamber accessible from top or bottom of the rotor and in the interior of the rotor body between the outer surface and the axial pump. The interior of the rotor frame may contain a sealed donut-shaped tube, and access thereto for replacement, with an hour-glass section having an axis angling up and away from the shaft to allow gravity to fill the lower chamber when the rotor is at rest. The sealed donut-shaped tube may correspond to the rotor inner chamber and be prevented from moving within the rotor chamber such that the lower inner portion of the hour-glass tube is filled with heat transfer fluid (600 degrees F./300 degrees C.) and a series of suspended and spaced sealed permanent magnets. When the rotor spins, the heat transfer fluid heats by friction caused from fluid's surfaces being moved within the tube as the rotor spins to move to the higher outer/upper portion of the hour-glass tube connecting passage. This transfers heat to the surrounding rotor, increasing it to temperatures which may allow flash phase change of atmospheric water to stream to thereby augment the drive of the rotor. In certain exemplary embodiments, this also allows the evenly spaced permanent magnets to be moved within the heat transfer fluid at a rotation different than the rotation of adjacent coils allowing the coils to produce electrical current to excite rotor/flywheel locking electromagnet/permanent magnet arrangement. This results in a system which allows the rotor to spin up until enough current is generated to lock the flywheel to the rotor thereby adding flywheel power to the turbine when spinning faster from more powerful wind speeds than with foil blade devices, effectively pumping air, and limiting over-spin, or other means, without limit for both heating the rotor and generating electricity to excite electromagnets for locking the flywheel and the rotor and thermal electrical generation.

At the focus or central passage of the concentrating section/profile curve of the rotor is a circumferential inner notch that further augments the concentration of the airflow. The inner portion of the inner notch is smooth to facilitate laminar airflow passage through the notch. At the densest concentration of the airflow near the entrance to the notch are top and bottom circumferential arrays of friction drive peltons integrally formed with notch material. The friction drive peltons may include without limitation arrangements employing a pelton turbine-like friction drive surface, which may be protruding or recessed, facing the oncoming airflow to better allow the airflow to push the drive surface of the peltons and escape back into the airflow after pushing. On the backside of the peltons include an airfoil-like curved surface that causes a low-pressure area that enhances the push and presents a streamlined surface on the turbulent airflow return side of the rotor. The drive surface of the peltons penetrate the airflow boundary layer at the entrance to the notch on the drive side in a non-harmonic way Thus, each pelton in the array can be dimensionally different and/or asymmetrically placed in the array zone marginal to the power curve array zone within a range of the geometric points related to the cup drive chords perpendicular to and facing the concentrated wind flow direction and corresponding with an imaginary radian.

The notch is exemplarily fabricated as a multi-part structure that may be attached and locked to the rotor body/frame and detached when eroded for replacement without removing the turbine from the connector mounts. The spinning balance of the rotor with the notch and non-uniform cup components is accomplished with corresponding voids on an opposite side of the notch part, such as may be accomplished, for example, with computer designed injection molded tooling. At the top outer edge of the rotor outer surface adjacent to the outer lower edge of the upper cowl are widely spaced Pelton/foil regions which are acted on by low-speed airflows to excite rotor when the airflow at the notch is insufficient.

At the top surface of the rotor inside of the concentrator curve corresponding to the lower surface of the cowl is an angled gravity seal for particulates, a structural cover to the rotor inner components, all containing permanent magnets corresponding to coils in the cowl lower surface, and a structural support axial pump bladed fan suspended to shaft bearings and attached to the rotor body similar to the lower structural support blade of the axial pump. Device arrangements of pelton/foil arrays include a division of pelton/foil orientation to allow operation of the device by winds from either direction when the device is mounted at building corners without vanes and in other environments of concentrating surfaces.

DETAILED DISCLOSURE

Figure 1:
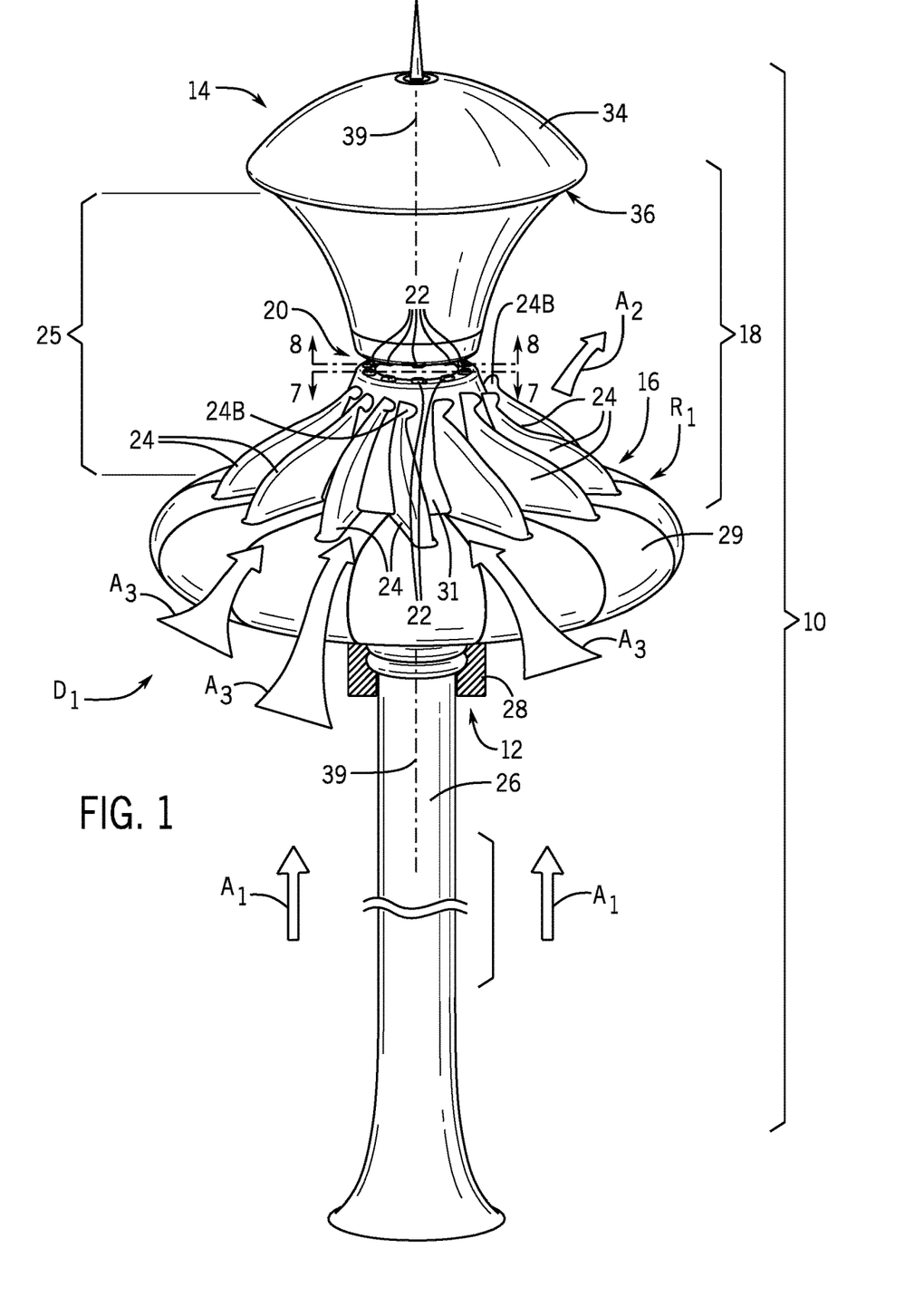
FIG. 1 depicts an exemplary embodiment of a vertical axis wind turbine of the present disclosure.

FIG. 1 depicts an exemplary embodiment of a vertical axis wind turbine 10. The vertical axis wind turbine 10 includes a rotor 25 and a shaft 12 to which an upper cowl 14 and a lower cowl 16 are fixed to a mounting surface of the shaft 12. The rotor 25, upper cowl 14, and the lower cowl 16 form a finial-like toroidal concentrator 18 which focuses wind energy into a narrow, annular central passage 20 on the outer surface of the toroidal concentrator 18. The shaft 12 is anchored to a mast or mount in the ground and extends in a vertical direction along a vertical axis 39. The size and/or scale of the vertical axis wind turbine 10 can vary based on manufacturing and mass production considerations interacting with geometric features of the location where the vertical axis wind turbine 10 will be utilized, the airflow or wind characteristics, and/or amount of electrical energy to be generated (e.g., human scale for personal use, industrial scale such as freestanding horizontal axis wind turbines and array installations on buildings, supersized scale for special locations). An example of a conventional wind turbine is disclosed in U.S. Pat. No. 5,520,505, which is incorporated by reference in entirety.

The rotor 25 includes a plurality of peltons 22 each having a radially extending pelton-foil regions 22A (FIG. 10) to which the concentrated airflow is directed to impart rotation of the rotor 25 about the shaft 12. The pelton-foil regions 22A are shaped with front side airflow-facing pelton wheel-like blade surface with central notch and abutting side cups 22B. Each pelton-foil region 22A also has a backside airfoil-like curved surface 22C (FIG. 10) that induces a low-pressure zone to enhance airflow force on the pelton-foil regions 22A. In another exemplary embodiment, each pelton 22 in the plurality of peltons 22 are recessed into the surface, or some combination of the two, without limit. The pelton wheel-like blade surface defines a chord 98 that extends perpendicular and facing the concentrated wind flow direction and corresponds with an imaginary radian (see FIGS. 7 and 10)

The lower cowl 16 further includes an outer surface 29 with a plurality of vanes 24 which are exemplarily generally larger than the plurality of peltons 22 of the rotor 25, and the vanes 24 on the lower cowl 16 operate to concentrate airflow (see arrows A3) on a drive side D1 of the rotor 25. The vanes 24 are also configured to defuse or shed the airflow (see arrow A2) on a return side R1 of the rotor 25 to create a low pressure area as the streamlined foil side of the rotor 25 rotates about the shaft 12 into the flow of the airflow relative to a center radial line and parallel to the center radial line. The vanes 24 include winglets 24B that extend away from the vanes 24 near the connection of the vane 24 to the rotor 25. As the airflow origination and/or direction changes, a person with ordinary skill will recognize that the relative locations and strengths of D1 and R1 will differ but tend toward a favorable power differential between D1 and R1 because of the ability of the turbine to accept and concentrate winds from all directions inherently without time lag for orientation of turbine adjustment. As will be described in further detail herein, the vanes 24 are exemplarily radially offset from one another to concentrate and channel airflow to rotor notch and may further be of comparatively different sizes and shapes in a manner so as to avoid harmonic noise similar to peltons 22. In exemplary embodiments, the vanes 24 are particularly used in operating the vertical axis wind turbine 10 at low wind speeds and extracting maximum power from high wind speeds by accelerating area of compressed airflow around the turbine, and increasing the density of the air, at the notch. The upper portion of the outer surface 29 of the lower cowl 16 slopes radially inward toward the rotor 25.

The vertical axis wind turbine 10 is further secured to a mast 26 that is anchored in the ground (not shown). A clamp connector 28 of the shaft 12 exemplarily secures the vertical axis wind turbine 10 to the mast 26 which may exemplarily be of any height or shape, and as will be described in further detail herein, in embodiments may be configured on an airflow enhancing frame to support, and further concentrate airflow onto, multiple vertical axis wind turbines. Exemplary airflows adjacent to the vertical axis wind turbine 10 are depicted in FIG. 1: arrow A1 depicts ambient atmospheric airflow moving in a direction toward the toroidal concentrator 18; arrow A3 depicts airflow being concentrated by the rotor 25 and cowls 14, 16 radially inwardly toward the central passageway 20; and arrow A2 depicts airflow shed away from the vertical axis wind turbine 10 after the airflow deflects away from the rotor 25. The ambient atmospheric airflow A1 may approach the turbine, and be focused to one side of the toroidal concentrator 18 from any direction, and the ambient atmospheric airflow A1 is radially inwardly concentrated by the rotor 25, upper cowl 14 and the lower cowl 16 (see airflow A3) such that the airflow A3 flows across the rotor 25 and thereby rotates electrical generating components of the rotor 25 such that the vertical axis wind turbine 10 generates electrical power, in one example, and that may be used for air pumping.

Figure 2:
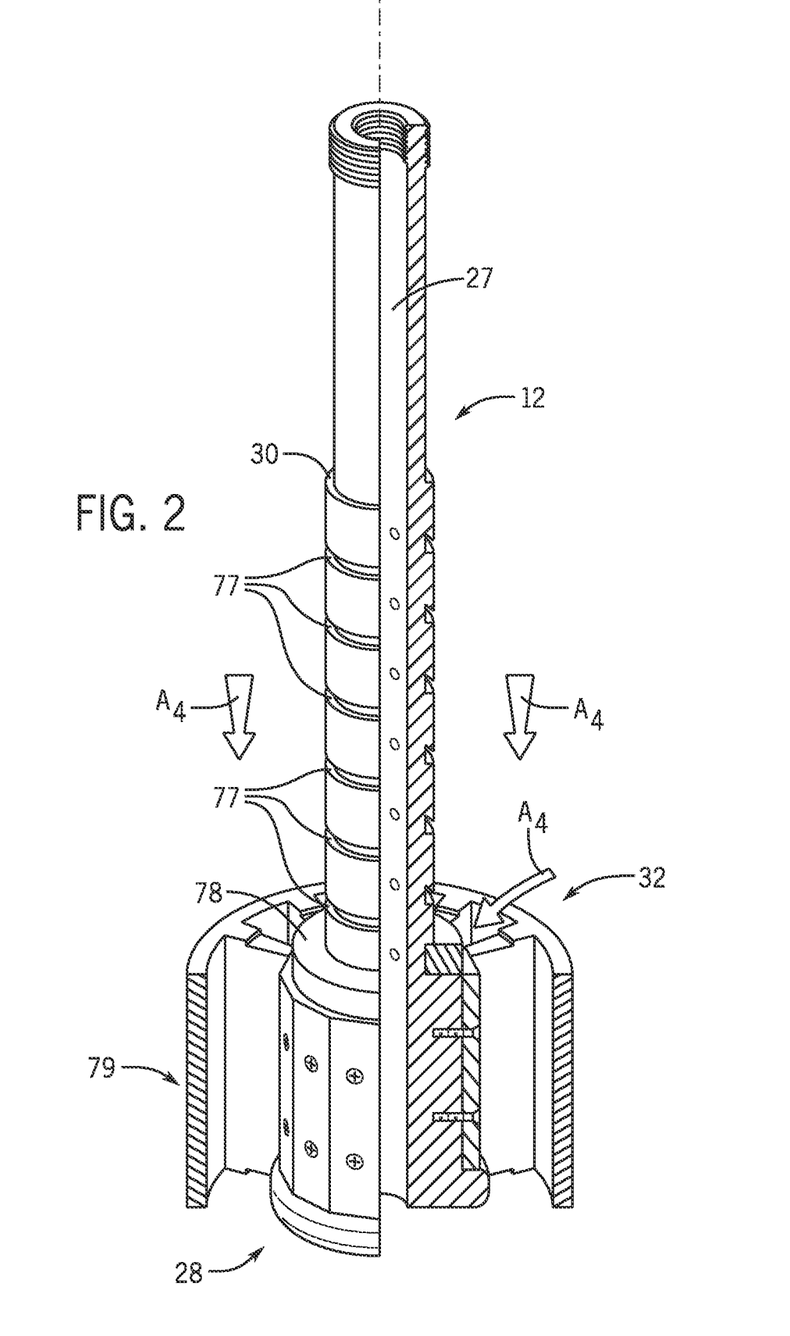
FIG. 2 is a cut-away view of an exemplary embodiment of a shaft of a vertical axis wind turbine.

FIG. 2 is a cutaway view of an exemplary embodiment of a shaft 12 for an exemplary vertical axis wind turbine 10. The shaft 12 includes a cowl shoulder 30 upon which the upper cowl 14 (FIG. 1) is affixed. The cowl shoulder 30 may be keyed for a stator clamp and a top rotor bearing unit (not shown). The shaft 12 further includes the clamp connector 28, passages 32 for pumped air, shoulders for stator clamps 77, and a shoulder 78 for a lower rotor bearing unit (not shown). The shaft 12 also includes a lower cowl mount 79. The passages 32 may be provided by separate plating or a structure that is unitary to the shaft 12 for attachment of stators 52 (FIG. 4), a lower rotor bearing unit, a flywheel bearing unit, and the lower cowl 16. The stators 52 are exemplarily depicted as blade sets coupled to the shaft 12 (see FIG. 4) and radially extending therefrom. Further, the rotor 25 encircles the blades of the stators 52, and the rotor 25 has alternately stacked inwardly extending rotor blade sets 55 surrounding and encircling the stators 52. The blades of the stators 52 (stator blade set) are interdigitated with the blades of a rotor blade set 55.

Figure 3:
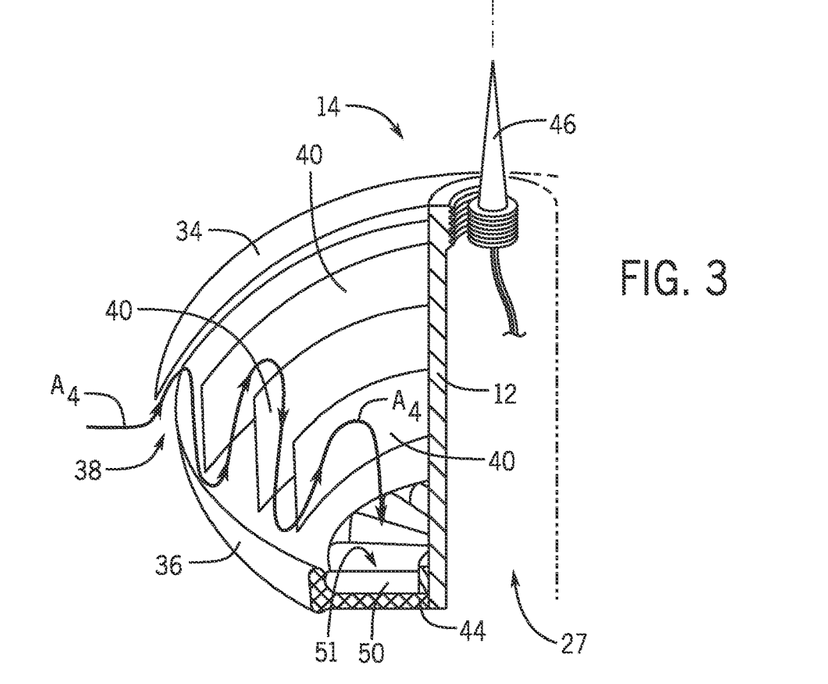
FIG. 3 is a partial cut-away view of an exemplary embodiment of an upper cowl.

FIG. 3 is a partial cutaway view of an upper cowl 14 of a vertical axis wind turbine 10. The upper cowl 14 includes an outer cover 34 (partially depicted to expose the interior of the upper cowl 14), and the outer cover 34 overhangs a base section 36 of the upper cowl 14 such that an air intake 38 is defined between the outer cover 34 and the base section 36. The base section 36 radially and circumferentially inwardly slopes upward to provide a gravity barrier for particulates (e.g., gravity seal), toward the base section 36 shaft attachment and entrance to axial pump part of rotor 25 (FIG. 1). A series of concentric top and bottom mounted baffles 40 direct the airflow (see Arrow A4) inward from the air intake 38 to openings in the upper cowl 14 and through a passage 51 exterior the shaft 12 to air pump blade set stage (see FIG. 4). Note that the baffles 40 are partially depicted in FIG. 3, and in certain exemplary embodiments, the baffles 40 are coupled to the outer cover 34 and extend toward the base section 36. In certain embodiments without limit, the baffles 40 define one or more paths with the upper cowl 14 (e.g., the baffles 40 define a spiral or other debris-clearing path). Accordingly, the airflow passes through the baffles 40 and is pumped by the stators 52 and the rotor blade set 55 which thereby act as or form an axial pump. That is, as the rotor 25 rotates, the blades of the rotor blade set 55 move relative to the blades of the stators 52 such that the air is pumped through passages to other more easily accessible rotating or energy producing devices connected to the vertical axis wind turbine 10 such as off the shelf turbine generator sets with pumped air directed on to turbine blades. A lower end 44 of the upper cowl 14 is supported on the cowl shoulder 30 (FIG. 2). A lightning safety rod 46 may be exemplarily secured to the upper cowl 14 and/or atop of the shaft 12 by a threaded connection to provide lightning protection. Wires (not shown) extend from fixed or pickup coils 50 in the upper and lower cowls 14, 16 to the ground. Additional wires (not shown) extend from the pickup coils 50 in the upper cowl 14 which have current induced from magnets 97 located in the rotor 25. In certain exemplary embodiments, wires extend from pickup coils 50 in the lower cowl 16 which have current induced from magnets 74 in a flywheel 76 (FIG. 5).

Figure 4:
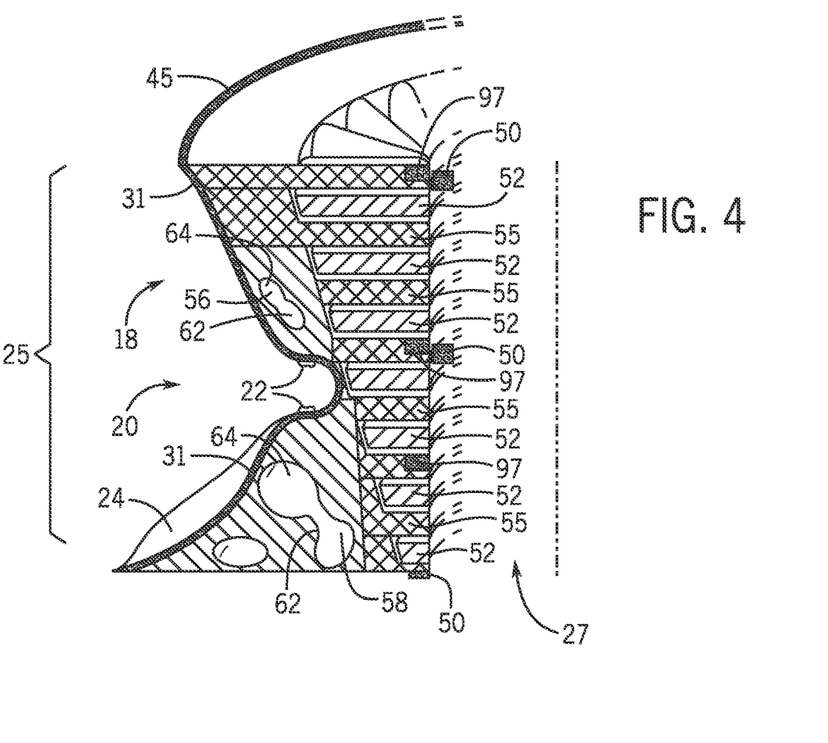
FIG. 4 is a partial cut-away view of an exemplary embodiment of a rotor having rotor blade sets, stator blade sets, and other interconnected rotor internal structures.
Figure 5:
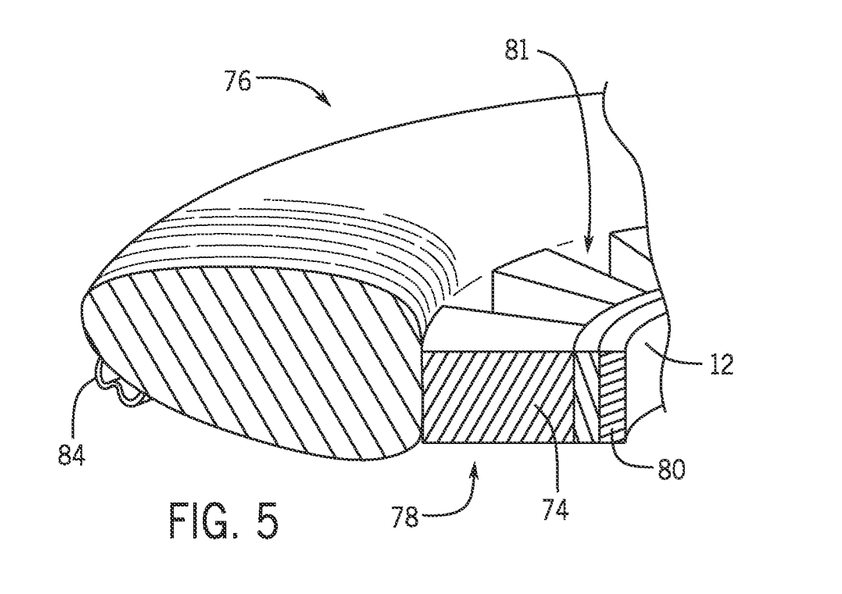
FIG. 5 is a partial cut-away view of an exemplary embodiment of a flywheel.

FIG. 4 is a partial cutaway view of an exemplary embodiment of the rotor 25. An interior surface of the rotor 25 exemplarily engages and rotates about the shaft 12 and creates a narrow separation void to limit debris particulates with the lower surface of the upper cowl 14. The rotor 25 outside the central concentrator notch has a smooth removable outer shell 45 to reduce wind from catching rotor component separation lines. A plurality of stator blade sets 52 extend outward from the shaft 12 and each stator 52 includes at least one pickup coil (not shown), the wire of which exemplarily extends through blade center and shaft wall ports into an interior passage 27 of the shaft 12 (see also FIG. 2)

The rotor 25 further exemplarily includes a circumferential upper heat transfer fluid chamber 56 located in the body of the rotor 25 between the axial pump and the outer surface 31 of the rotor 25 and in a position above the central passage 20. A lower heat transfer fluid chamber 58 in the body of the rotor 25 is positioned between the axial pump and the outer surface 31 of the rotor 25 at a position below the central passage 20. In an exemplary embodiment, the lower heat transfer fluid chamber 58 is exemplarily larger than the upper heat transfer fluid chamber 56, although it will be recognized by a person of ordinary skill in the art that in other exemplary embodiments, the relative sizes of the heat transfer fluid chambers 56, 58 may be reversed, although in an exemplary embodiment the diameters of the axial pump stages and the lengths of the stators 52 and the rotor blade sets 55 sequentially radially decrease. Therefore, there is exemplarily greater room within the body of the rotor 25 to form a larger heat transfer fluid chamber in the position of the lower heat transfer fluid chamber 58. The upper and lower heat transfer fluid chambers 56, 58 are exemplarily filled with a heat transfer fluid that can absorb heat generated by friction on heat transfer fluid 60 during rotation of the rotor 25 during operation of the vertical axis wind turbine 10. The passage 27 extends along the vertical axis 39 of the vertical axis wind turbine 10, and the passage 27 allows for the passage of connectors, wires, air, and other components of the vertical axis wind turbine 10.

As the rotor 25 spins, the heat transfer fluid in the lower and upper heat transfer fluid chambers 56, 58 heats, expands, and moves upwards and outwards from a lower portion 62 of the chambers 56, 58 to an upper portion 64. The mass of heat transfer fluid in the lower heat transfer fluid chamber 56 is near the center of the rotor 25 for easing rotor 25 excitement, and the heat transfer fluid moves to the upper portions 64 for greater heat transfer as the heat transfer fluid moves in the fluid chambers 56, 58. In certain examples, heat transfer fluid is friction heated. In this manner, the heat transfer fluid moving between the chambers 56, 58 transfers heat to the nearby outer surface of the rotor 25. When sufficient heat is generated, the outer surface 31 of the rotor 25 may become so hot that water in the ambient air surrounding the rotor 25 flash phase changes into steam, which further assists to spin the rotor 25 of the vertical axis wind turbine 10.

Figure 6:
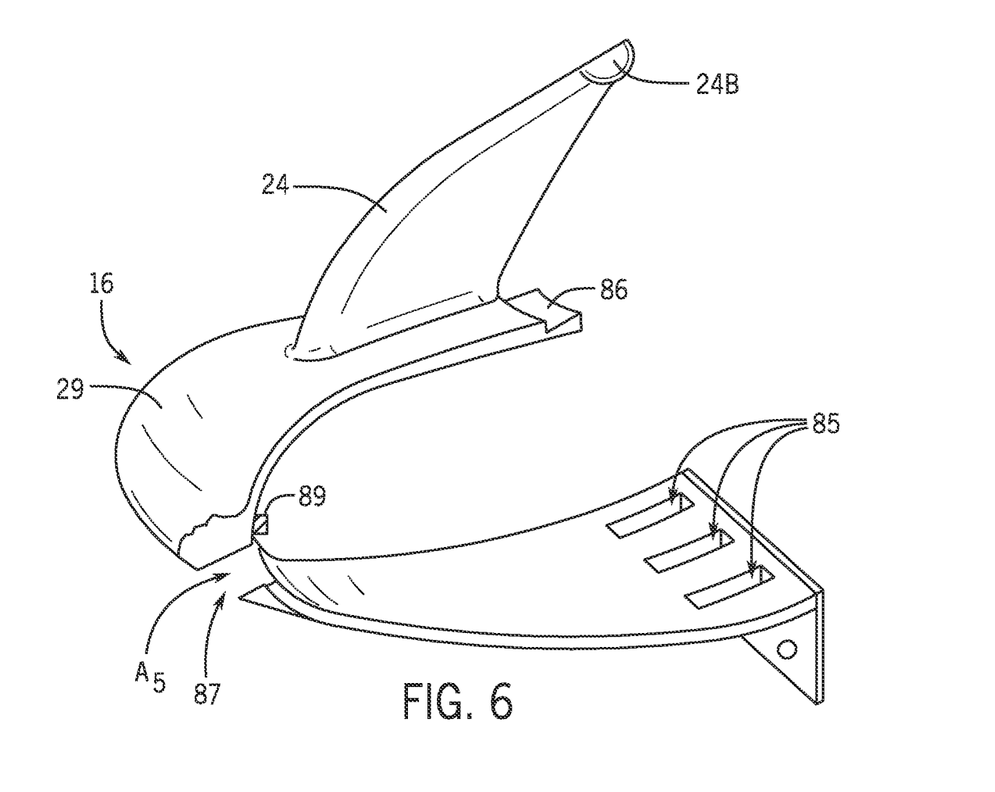
FIG. 6 depicts an exemplary embodiment of a section of a lower cowl section with attached concentrating vane.

FIG. 5 is a partial cutaway view of an exemplary embodiment of a flywheel 76. The flywheel 76 defines a pumped air passageway and drip slot 81 through which debris and/or fluid may fall (FIG. 4). The upper and lower surfaces of the flywheel 76 advantageously act as a gravity stop to limit particulate entry into lower cowl 16 (FIG. 1). The flywheel 76 further includes a bearing 80 about which the flywheel 76 spins around the shaft 12 when the flywheel 76 is excited and when locked to the rotor 25. Permanent magnets 74 of the flywheel 76 lock the flywheel 76 into corresponding rotation with the rotor 25 (FIG. 4) such that the flywheel 76 and the rotor 25 rotate together when the rotor 25 rotates at a predetermined speed. In certain exemplary embodiments, a plurality of flywheel peltons 84 are coupled to the flywheel 76 and are for driving the flywheel 76 as a low-speed airflow (see arrow A5 on FIG. 6) is received into the lower cowl 16 via inlets 87 (see FIG. 6, note that FIG. 6 is depicted with a partial cross section to depict the inlets 87). The flywheel peltons 84 can be arranged in an array on the upper surface or the lower surface of the flywheel 76, and the flywheel peltons 84 can include features similar to the features described above with respect to the peltons 22. In certain exemplary embodiments, an airflow concentrator 89 is positioned relative to the inlets 87 and is configured to concentrate the airflow (see arrow A5) across the flywheel peltons 84 (see FIG. 5).

FIG. 6 depicts an exemplary embodiment of a section of the lower cowl 16 with a concentrating vane 24 attached thereto and angled to concentrate airflow (see arrow A3 on FIG. 1) toward the central passage 20 with vane winglet 24B at top vane edge to further concentrate airflow. Each section of the lower cowl 16 includes a top key tab lock 86 which facilitates coupling the sections of the lower cowl 16 to the shaft 12 and/or the rotor 25. As sections of the lower cowl 16 are coupled to the shaft 12, the sections are movable relative to each other (e.g., as the sections are loosely coupled to the shaft). Once all the sections of the lower cowl 16 are on the shaft 12, the sections can be tightened relative to each other and the shaft 12 such that the lower cowl 16 is formed without "play" between the sections of the lower cowl 16 and with a circumferential lock using tab locks 86 at the distal edge of the lower cowl 16 when cowl components finally tightened in place. The section of the lower cowl 16 also includes one or more openings 85 that permit debris and fluids in the lower cowl 16 to fall by gravity out of the interior space defined by the lower cowl 16.

Figure 7:
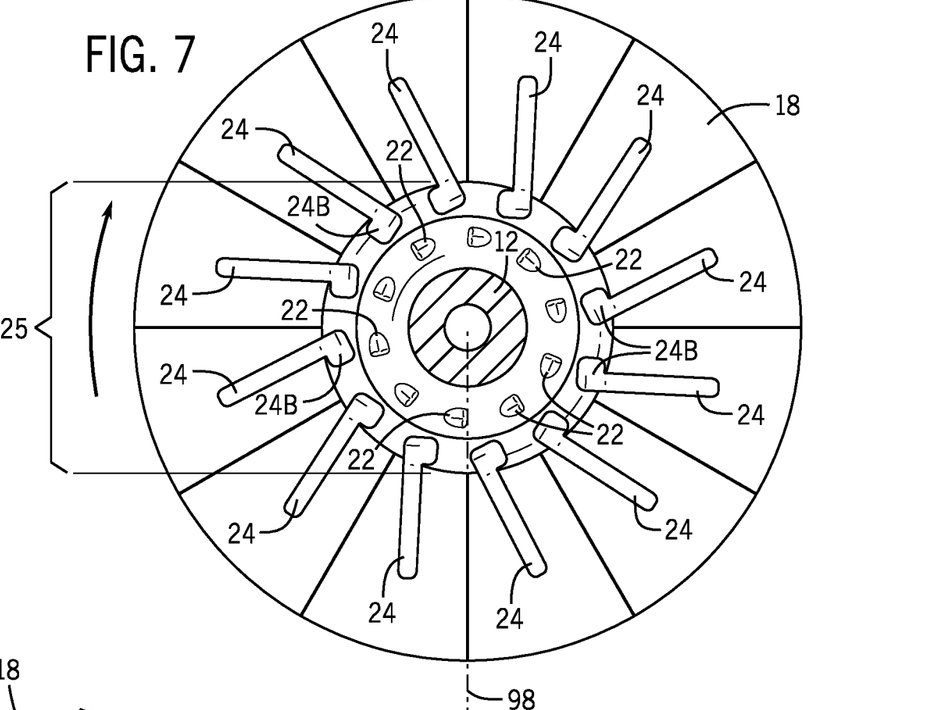
FIG. 7 is a sectional view taken along line 7-7 of FIG. 1 looking vertically down.

FIG. 7 is an exemplary sectional view taken along line 7-7 of FIG. 1 and provides a top view looking vertically down onto the peltons 22 and the vanes 24. As exemplarily depicted in FIG. 8, the rotor 25 rotates about the shaft 12, such rotation being caused by the force of concentrated airflow against the peltons 22. The peltons 22 are located within the central passage 20 of the toroidal concentrator 18, while the vanes 24 are located on the surrounding lower cowl 16. As explained above, in an exemplary embodiment, the vanes 24 are organized in a marginally non-symmetrical array parallel to an imaginary radial pattern about the axis of rotation of the rotor 25 such as to limit any harmonic vibrations of the vertical axis wind turbine 10 during operation.

Figure 8:
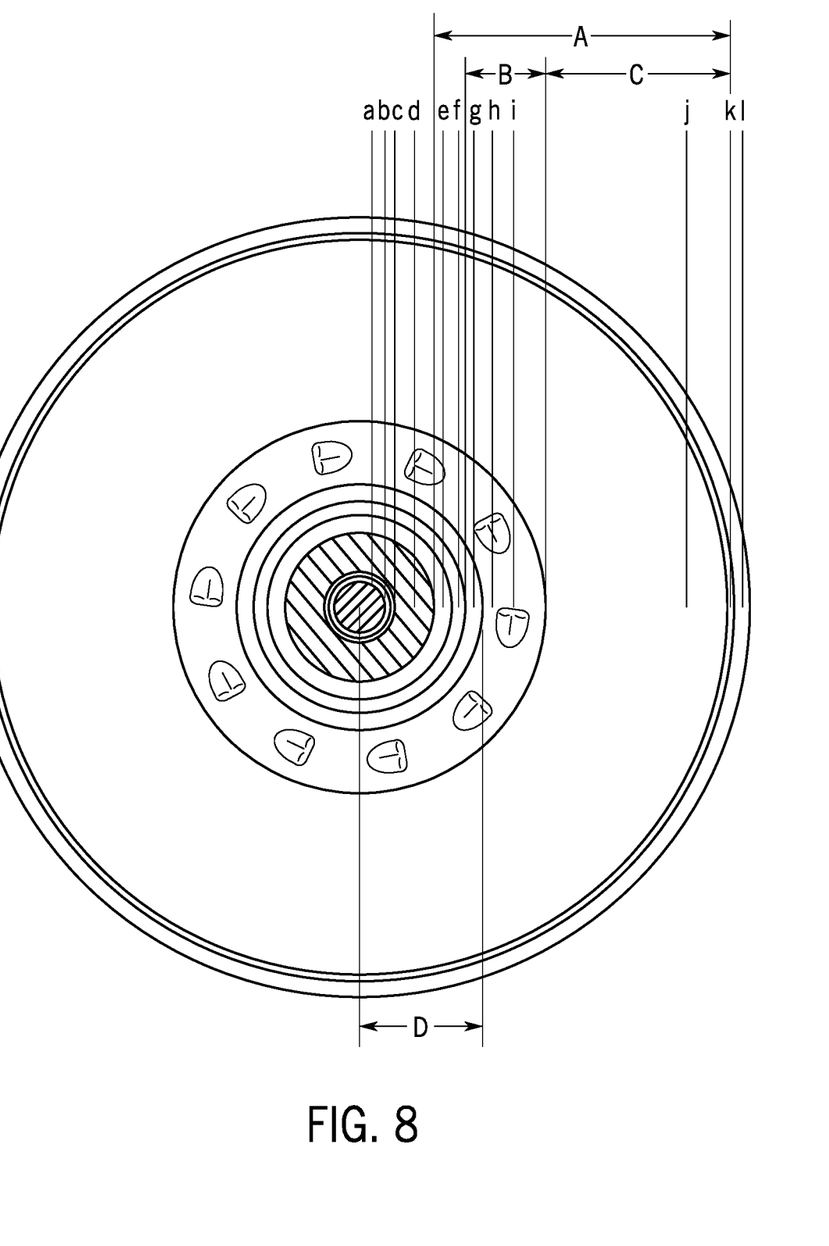
FIG. 8 is a sectional view taken along line 8-8 of FIG. 1 looking vertically up.

FIG. 8 is an exemplary sectional view taken along line 8-8 on FIG. 1. In FIG. 8, components of the toroidal concentrator 18, including the upper cowl 14 and the rotor 25 are labeled as follows:
   A—rotating assembly;
   B—replaceable notch;
   C—outer focus zone;
   D—in section;
   a—support shaft void;
   b—support shaft wall;
   c—stator blade mount;
   d—air pump void;
   e—rotor blade mount;
   f—rotor assembly frame;
   g—replaceable drive notch inner wall section;
   h—inner notch surface;
   i—pelton/foil drive region surface;
   j—outer focus surface with low airspeed excitement pelton/foil regions with minimal drag;
   k—air pump intake gap; and
   l—overhanging fixed upper cowl.

Figures 9, 10:
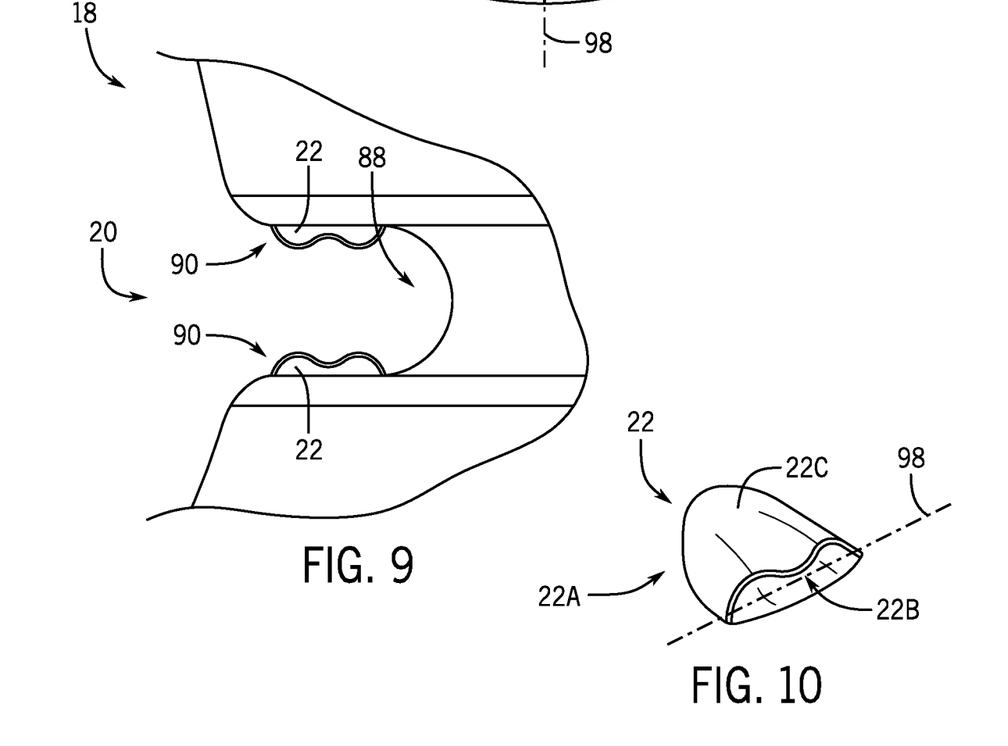
FIG. 9 is a detailed partial view of a central passage region of an exemplary embodiment of a vertical axis wind turbine.
FIG. 10 is a detailed view of an exemplary embodiment of a pelton-foil region.

FIG. 9 is a close-up detailed view, in half section, of a central passage 20 of a rotor 25. Note that in this exemplary embodiment, the peltons 22 are within the central passage 20. The central passage 20 provides an annular notch or void 88 at the narrowest point of the toroidal concentrator 18. This allows flow of the most concentrated portion of the concentrated airflow thereby drawing even more airflow across the peltons 22 located at the entrance to the central passage 20.

The peltons 22 further penetrate a boundary layer 90 of airflow just at the entrance to the central passage 20 where laminar airflow about the central passage 20 is strongest. The peltons 22 are exemplarily formed in a cup-shape as depicted in greater detail in FIG. 10. The pelton cup-shape is streamlined in the direction of rotation and thus differentiates a high and low pressure sides, such as the drive side D1 and the return side R1 (FIG. 1), of the rotor 25. The peltons 22 differ within a marginal dimensional range for similar reasons as discussed above with regards to the vanes 24. The use of differently sized and dimensioned peltons 22 about the central passage 20 helps to reduce and/or avoid harmonic noise and provides counterbalancing to allow high rotation speeds. A person of ordinary skill in the art will recognize the airflow A1 flows from the drive side D1 of the rotor 25 to the opposite return side R1 of the rotor 25 (FIG. 1) and that the location of the drive side D1 and the return side R1 may vary depending on the wind direction of the air surrounding the vertical axis wind turbine 10.

Figure 13:
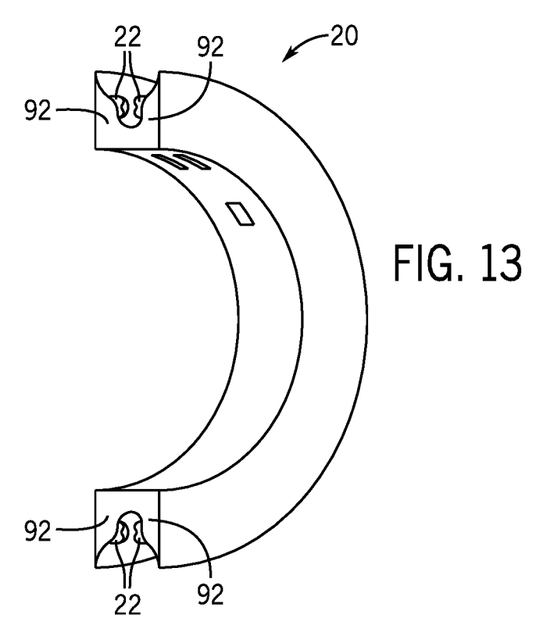
FIG. 13 depicts an exemplary embodiment of half of a replaceable pelton region of a vertical wind turbine.

FIG. 13 depicts an exemplary embodiment of a replaceable central passage 20 in an exemplary embodiment, the central passage 20 and the peltons 22 of the central passage 20 are subjected to the most extreme conditions of the vertical axis wind turbine 10 and therefore may suffer the greatest from erosion. In an exemplary embodiment, the central passage 20 may be provided as a replaceable component. As exemplarily depicted in FIG. 13, the replaceable central passage 20 may be provided as to snap fit halves. In an exemplary embodiment, keyed connectors 92 located on either end of the replaceable central passage half provide a snap fit and secure lock to complete replacement of the central passage 20.

Figure 11:
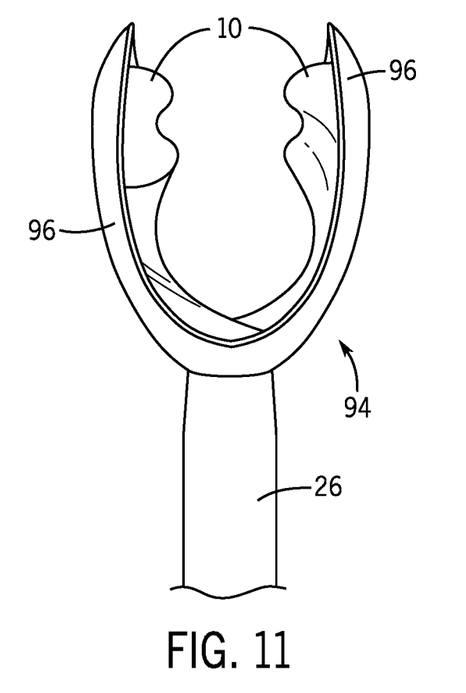
FIG. 11 depicts an exemplary embodiment of a multiple turbine array.
Figure 12:
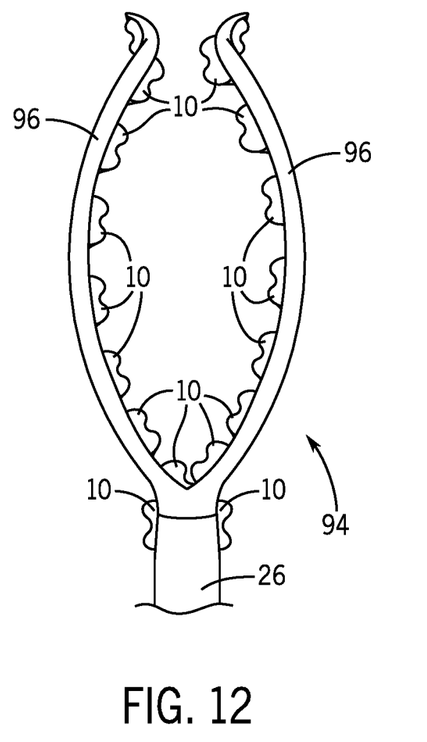
FIG. 12 depicts an additional exemplary embodiment of a multiple turbine array.
Figure 14:
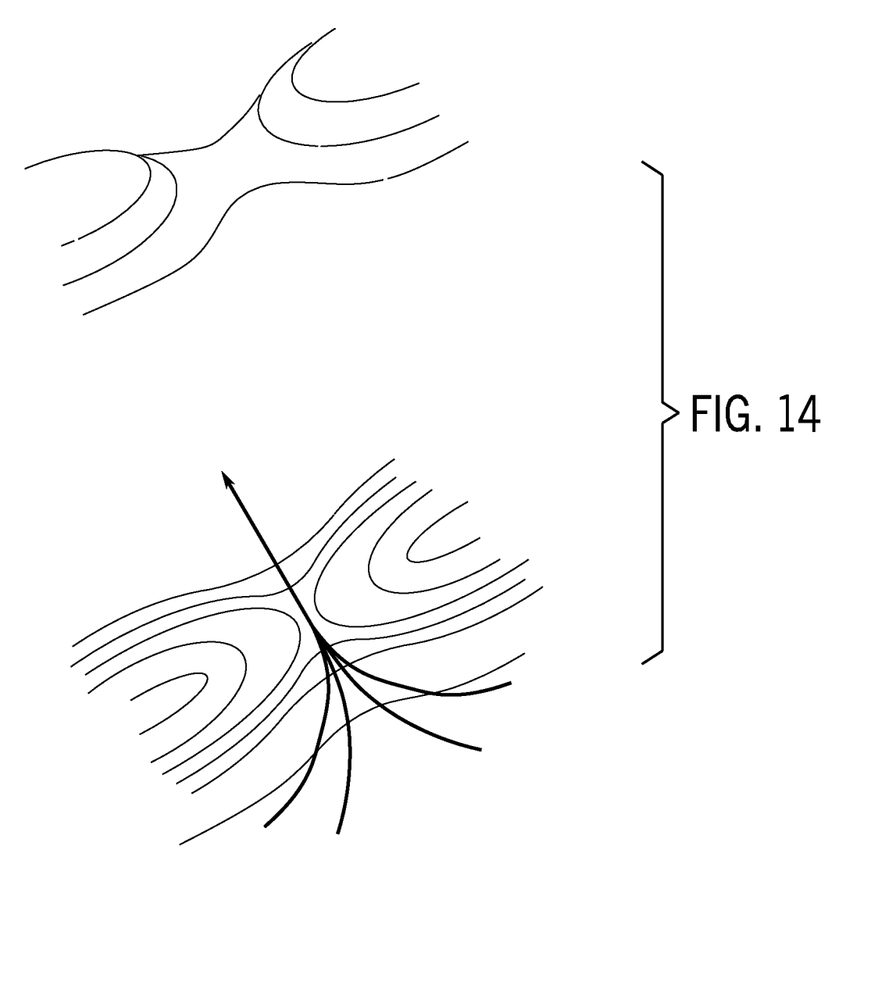
FIG. 14 exemplarily depicts land surface contours that concentrate airflow.

FIGS. 11 and 12 depict exemplary embodiments of multiple wind turbine systems 94. In an exemplary embodiment, multiple wind turbine systems 94 include a mast 26 to which multiple vertical axis wind turbines 10 are secured. Secondary masts 96 may branch from the primary mast 26 and one or more vertical axis wind turbines 10 secured to each of the secondary masts 96 which may be shaped to further concentrate airflows. FIG. 14 depicts an informational view of surface contours which may exemplarily result in the concentration of wind flow therethrough. As depicted in FIG. 14, wind is directed through a locally lowest position between obstructions.

In certain examples, a wind turbine includes a shaft vertically extending along an axis, a plurality of stator blades coupled to the shaft and radially extending therefrom and a rotor rotatably coupled to the shaft and encircling the plurality of stator blades. An upper cowl is coupled to the shaft vertically above the rotor, and a lower cowl is coupled to the shaft vertically below the rotor. The rotor, the upper cowl and/or the lower cowl are configured to radially inwardly concentrate airflow across the rotor such that the rotor rotates and the wind turbine generates electrical power. The upper cowl has a base section that radially inwardly slopes toward the rotor and the lower cowl has an outer cover that radially inwardly slopes toward the rotor. In certain examples, the rotor defines an annular passage configured to permit the airflow to flow from a drive side of the rotor to a return side of the, and the passage has an annular void configured to further concentrate the airflow. In certain examples, the rotor has a plurality of peltons that are configured to cause rotation of the rotor as the airflow moves across the rotor and the plurality of peltons. The peltons can be radially spaced around the shaft, and the in certain examples, the at least one pelton in the plurality of peltons is shaped differently than the remaining peltons in the plurality of peltons to thereby reduce harmonic noise.

In certain examples, the lower cowl has a plurality of vanes configured to concentrate the airflow on a drive side of the rotor and defuse the airflow on an opposite return side of the rotor. The vanes can each have a winglet extending therefrom that reduces drag of the airflow. In certain examples, the airflow is a primary airflow and the upper cowl has an air intake configured to receive a secondary airflow and a plurality of internal baffles configured to direct the secondary airflow to an axial pump. The baffles may define one or more concentric paths along which the secondary airflow flows, and the secondary airflow can flow from the upper cowl through a passage that is exterior of the shaft and interior to the rotor. In certain examples, the rotor has a plurality of rotor blades and the rotor blades of the plurality of rotor blades are interdigitated with the stator blades of the plurality of stator blade. The rotor blades move relative to the stator blades to thereby pump the secondary airflow. The rotor blades and the stator blades are configured to pump the secondary airflow such that the secondary airflow activates a secondary energy producing device that generates electrical power.

In certain examples, a flywheel rotatably coupled to the shaft and positioned within the lower cowl, and wherein rotation of the rotor causes the flywheel to rotate. The flywheel can include a plurality of flywheel magnets and rotation of the flywheel causes the flywheel magnets and fixed coils positioned in the lower cowl to generate electrical power. In certain examples, when the rotor rotates at a predetermined speed the flywheel magnets magnetically couple the flywheel to the rotor such that the flywheel and the rotor rotate together. The flywheel can include a plurality of flywheel peltons that causes rotation of the flywheel as a second airflow moves across the flywheel peltons.

In certain examples, the rotor defines a lower chamber and an upper chamber that collectively contain a heat transfer fluid. The lower chamber is fluidly connected to the upper chamber such that the heat transfer fluid flows between the lower chamber and the upper chamber as the rotor rotates. The heat transfer fluid is configured to absorb heat generated by the rotor and radially outwardly transfer heat as the rotor rotates and as the heat transfer fluid flows between the lower chamber and the upper chamber. The heat transfer fluid heats an exterior surface of the rotor such that moisture in the airflow adjacent to the exterior surface of the rotor phase-changes to steam. In certain examples, the rotor has magnets that move relative to coils positioned along the shaft to thereby induce current in the coils and generate electrical energy.

In the present description, certain terms have been used for brevity, clarity, and understanding. No unnecessary limitations are to be inferred therefrom beyond the requirement of the prior art because such terms are used for descriptive purposes and are intended to be broadly construed. The different apparatuses, systems, and method steps described herein may be used alone or in combination with other apparatuses, systems, and methods. It is to be expected that various equivalents, alternatives and modifications are possible within the scope of the appended claims.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A wind turbine comprising:
a shaft vertically extending along an axis;
a plurality of stator blades coupled to the shaft and radially extending therefrom;
a rotor rotatably coupled to the shaft and encircling the plurality of stator blades;
an upper cowl coupled to the shaft vertically above the rotor; and
a lower cowl coupled to the shaft vertically below the rotor;
wherein the upper cowl and the lower cowl are each configured to radially inwardly direct airflow along exteriors of the upper cowl and the lower cowl respectively and further concentrate airflow across the rotor such that the rotor rotates and the wind turbine generates electrical power.

2. A wind turbine comprising:
a shaft vertically extending along an axis;
a plurality of stator blades coupled to the shaft and radially extending therefrom;
a rotor rotatably coupled to the shaft and encircling the plurality of stator blades;
an upper cowl coupled to the shaft vertically above the rotor; and
a lower cowl coupled to the shaft vertically below the rotor;
wherein the rotor, the upper cowl, and the lower cowl are configured to radially inwardly concentrate airflow across the rotor such that the rotor rotates and the wind turbine generates electrical power; and
wherein the upper cowl has a base section that radially inwardly slopes toward the rotor and the lower cowl has an outer surface that radially inwardly slopes toward the rotor.

3. A wind turbine comprising:
a shaft vertically extending along an axis;
a plurality of stator blades coupled to the shaft and radially extending therefrom;
a rotor rotatably coupled to the shaft and encircling the plurality of stator blades;
an upper cowl coupled to the shaft vertically above the rotor; and
a lower cowl coupled to the shaft vertically below the rotor;
wherein the rotor, the upper cowl, and the lower cowl are configured to radially inwardly concentrate airflow across the rotor such that the rotor rotates and the wind turbine generates electrical power; and
wherein the rotor defines an annular passage configured to permit the airflow to flow from a drive side of the rotor to a return side of the rotor.

4. The wind turbine according to claim 3, wherein the passage has an annular void configured to further concentrate the airflow.

5. A wind turbine comprising:
a shaft vertically extending along an axis;
a plurality of stator blades coupled to the shaft and radially extending therefrom;
a rotor rotatably coupled to the shaft and encircling the plurality of stator blades;
an upper cowl coupled to the shaft vertically above the rotor; and
a lower cowl coupled to the shaft vertically below the rotor;
wherein the rotor, the upper cowl, and the lower cowl are configured to radially inwardly concentrate airflow across the rotor such that the rotor rotates and the wind turbine generates electrical power; and
wherein the rotor has a plurality of peltons that are configured to cause rotation of the rotor as the airflow moves across the rotor and the plurality of peltons.

6. The wind turbine according to claim 5, wherein the peltons are radially spaced around the shaft.

7. The wind turbine according to claim 5, wherein at least one pelton in the plurality of peltons is shaped differently than the remaining peltons in the plurality of peltons to thereby reduce harmonic noise.

8. The wind turbine according to claim 5, wherein the rotor defines a lower chamber and an upper chamber that collectively contain a heat transfer fluid;
wherein the lower chamber is fluidly connected to the upper chamber such that the heat transfer fluid flows between the lower chamber and the upper chamber as the rotor rotates; and
wherein the heat transfer fluid is configured to absorb heat generated by friction on the heat transfer fluid as the rotor rotates and radially outwardly transfer heat as the rotor rotates and as the heat transfer fluid flows within the lower chamber and the upper chamber.

9. The wind turbine according to claim 8, wherein the heat transfer fluid heats an exterior surface of the rotor such that moisture in the airflow adjacent to the exterior surface of the rotor phase-changes to steam.

10. A wind turbine comprising:
a shaft vertically extending along an axis;
a plurality of stator blades coupled to the shaft and radially extending therefrom;
a rotor rotatably coupled to the shaft and encircling the plurality of stator blades;
an upper cowl coupled to the shaft vertically above the rotor; and
a lower cowl coupled to the shaft vertically below the rotor;
wherein the rotor, the upper cowl, and the lower cowl are configured to radially inwardly concentrate airflow across the rotor such that the rotor rotates and the wind turbine generates electrical power; and
wherein the lower cowl has a plurality of vanes configured to concentrate the airflow on a drive side of the rotor and defuse the airflow on an opposite return side of the rotor.

11. The wind turbine according to claim 10, wherein each vane in the plurality of vanes has a winglet extending therefrom that reduces drag of the airflow.

12. A wind turbine comprising:
a shaft vertically extending along an axis;
a plurality of stator blades coupled to the shaft and radially extending therefrom;
a rotor rotatably coupled to the shaft and encircling the plurality of stator blades;
an upper cowl coupled to the shaft vertically above the rotor; and
a lower cowl coupled to the shaft vertically below the rotor;

wherein the rotor, the upper cowl, and the lower cowl are configured to radially inwardly concentrate airflow across the rotor such that the rotor rotates and the wind turbine generates electrical power; and wherein the airflow is a primary airflow, and wherein the upper cowl has an air intake configured to receive a secondary airflow and a plurality of internal baffles configured to direct the secondary airflow to an axial pump.

13. The wind turbine according to claim 12, wherein the internal baffles define one or more concentric paths along which the secondary airflow flows.

14. The wind turbine according to claim 12, wherein the secondary airflow flows from the upper cowl through a passage that is exterior of the shaft.

15. The wind turbine according to claim 12, wherein the rotor has a plurality of rotor blades and the rotor blades of the plurality of rotor blades are interdigitated with the stator blades of the plurality of stator blades; and wherein the rotor blades move relative to the stator blades to thereby pump the secondary airflow.

16. The wind turbine according to claim 15, wherein the rotor blades and the stator blades are configured to pump the secondary airflow such that the secondary airflow activates a secondary energy producing device that thereby generates electrical power.

17. A wind turbine comprising:
a shaft vertically extending along an axis;
a plurality of stator blades coupled to the shaft and radially extending therefrom;
a rotor rotatably coupled to the shaft and encircling the plurality of stator blades;
an upper cowl coupled to the shaft vertically above the rotor; and
a lower cowl coupled to the shaft vertically below the rotor;
wherein the rotor, the upper cowl, and the lower cowl are configured to radially inwardly concentrate airflow across the rotor such that the rotor rotates and the wind turbine generates electrical power; and
further comprising a flywheel rotatably coupled to the shaft and positioned within the lower cowl, and wherein rotation of the rotor causes the flywheel to rotate.

18. The wind turbine according to claim 17, wherein the flywheel has a plurality of flywheel magnets, and wherein rotation of the flywheel causes the flywheel magnets and fixed coils positioned in the lower cowl to generate electrical power.

19. The wind turbine according to claim 17, wherein when the rotor rotates at a predetermined speed the flywheel magnets magnetically couple the flywheel to the rotor such that the flywheel and the rotor rotate together.

20. The wind turbine according to claim 19, wherein the flywheel has a plurality of flywheel peltons that cause rotation of the flywheel as a second airflow moves across the flywheel peltons.

21. A wind turbine comprising:
a shaft vertically extending along an axis;
a plurality of stator blades coupled to the shaft and radially extending therefrom;
a rotor rotatably coupled to the shaft and encircling the plurality of stator blades;
an upper cowl coupled to the shaft vertically above the rotor; and
a lower cowl coupled to the shaft vertically below the rotor;
wherein the rotor, the upper cowl, and the lower cowl are configured to radially inwardly concentrate airflow across the rotor such that the rotor rotates and the wind turbine generates electrical power; and
wherein the rotor has magnets that move relative to coils positioned along the shaft to thereby induce current in the coils and generate electrical energy.

22. A wind turbine comprising:
a shaft vertically extending along an axis;
a plurality of stator blades coupled to the shaft and radially extending therefrom;
a rotor rotatably coupled to the shaft and encircling the plurality of stator blades;
an upper cowl coupled to the shaft vertically above the rotor; and
a lower cowl coupled to the shaft vertically below the rotor, the lower cowl having an outer surface and a plurality vanes;
wherein each of the upper cowl, the outer surface of the lower cowl, and the plurality of vanes of the lower cowl are configured to radially inwardly concentrate airflow across the rotor such that the rotor rotates and the wind turbine generates electrical power.

* * * * *